Figure 1:
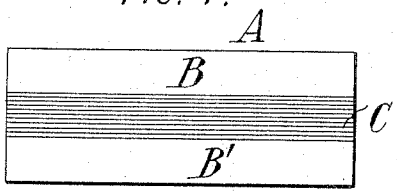

J. NEILL.
MANUFACTURE OF HACKSAWS OR THE LIKE.
APPLICATION FILED JUNE 23, 1906.

907,167.
Patented Dec. 22, 1908.

WITNESSES:
Fred White
Rene Bruine

INVENTOR:
James Neill,
By Attorneys,
Arthur E. Frasers Uaina

UNITED STATES PATENT OFFICE.

JAMES NEILL, OF SHEFFIELD, ENGLAND.

MANUFACTURE OF HACKSAWS OR THE LIKE.

No. 907,167.   Specification of Letters Patent.   Patented Dec. 22, 1908.

Application filed June 23, 1906. Serial No. 323,045.

*To all whom it may concern:*

Be it known that I, JAMES NEILL, a subject of the King of Great Britain, residing at Sheffield, England, have invented certain new and useful Improvements in the Manufacture of Hacksaws or the Like, of which the following is a specification.

The object of the invention is to provide an improved and highly efficient method of manufacturing hack saws and similar articles having an edge of great hardness and consequent durability, and a back of such toughness as to compensate for the comparative brittleness of the edge, so as to prevent the frequent breakages which occur with saws the entire blade of which is of hard steel; the product being of great uniformity and of accurately controllable structure, composition and properties.

A compound strip or ribbon is formed having high carbon steel at one edge and low carbon steel at the other edge, the two steels being integrally united to each other. The teeth of the saw are then formed on the high carbon edge, and the entire bar is subjected to any usual or suitable hardening process such, for example, as heating and quenching in oil. This hardening process is effective only on high carbon steel. Consequently the edge of the saw is given a temper of great hardness, the degree being regulable by regulating the composition of the corresponding edge of the strip, and by varying the conditions of the hardening operation. At the same time the low-carbon steel back of the saw is substantially unaltered from its original tough nature. Ordinarily the strip will be quite thin, and the high carbon steel will extend throughout the thickness thereof. Any desired ratio between the width of tough backing and the width of hard edge may be obtained by correspondingly proportioning the widths of the low and high carbon steel respectively in the strip, such ratio being entirely independent of the hardening operation, and being therefore easily and accurately controllable.

The preferred method of making the strip is as follows: An ingot is cast of the two steels, one cast upon the other so that they are practiaclly integrally welded together and remain so throughout the subsequent operations. The ingot is then manipulated in the usual or any suitable way to reduce it to a billet of suitable size for rolling, and the billet rolled to produce a strip or ribbon of the thickness of the saw blade desired.

To roll a strip or ribbon of the comparatively slight width of a hack saw-blade, calls for the making of an unusually small billet, and for a large number of rolling operations to reduce the width as well as the thickness; and calls also for the trimming of two edges for each blade manufactured. In order to reduce these items of expense, I preferably form the ingot with two strips of one sort of steel, one on each side of an intermediate strip of the other steel, eventually producing a corresponding strip of suitable width to produce two or more blades, and I then divide the composite strip along the center of the intermediate steel. Such a strip of multiple width requires only the trimming of the two outer edges plus a single longitudinal cut for each additional blade manufactured.

Preferably the intermediate metal is the high-carbon steel, and the low-carbon steel is arranged at each side of the intermediate strip, and I preferably manufacture the blades two at a time from such a double bar by dividing it along the center of the high-carbon steel.

Besides the advantage in the lessened amount of manipulation and in the fewer cuts to be made, such a strip with the high carbon at the center has distinct technical advantages. It must be remembered that the strip or ribbon is of extreme thinness and therefore very susceptible to the cooling action of the atmosphere in rolling. Ordinarily it is rolled first hot and finally cold. If the high-carbon steel is at the outer edges of the strip instead of at the center, it is crinkled as it comes out of the rolls, the tendency being particularly noticeable in excessively thin work such as this; whereas when it is in the center, no such crinkling is observed, being prevented apparently by the fact that the high-carbon steel is held at each edge by the soft carbon steel. Another decided advantage arising from the arranging of the high-carbon steel in the center, is its protection from becoming burned or "fire-edged" during the hot rolling process. The edges of such strips are always noticeably burned, so that by placing the steel which is to form the edge of the tool at the center of the strip, a better wearing edge of the tool is insured;

while the burning has no substantial disadvantage for the low-carbon back of the tool.

The accompanying drawings illustrate an embodiment of the invention.

Figure 2:
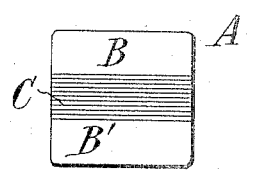
Figure 3:
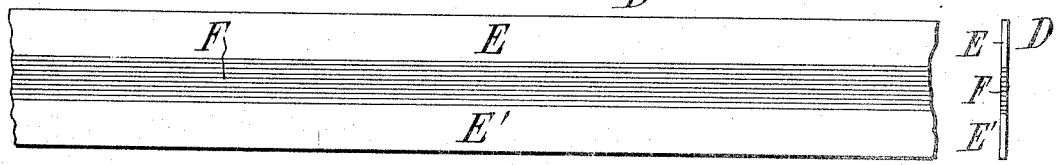
Figure 4:
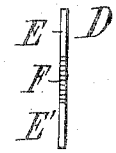
Figure 5:
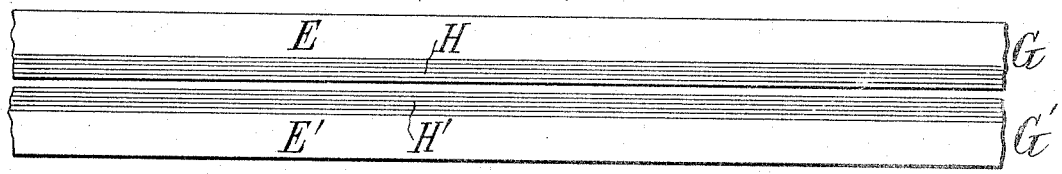
Figure 6:
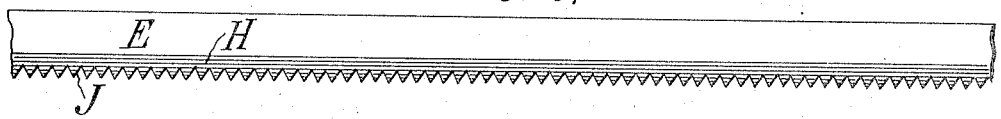
Figure 7:
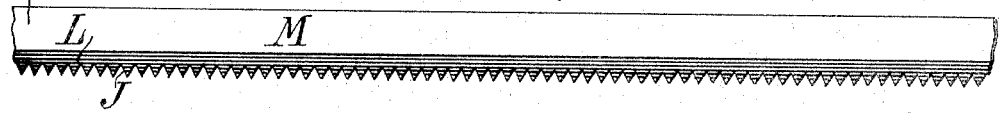
Figure 8:
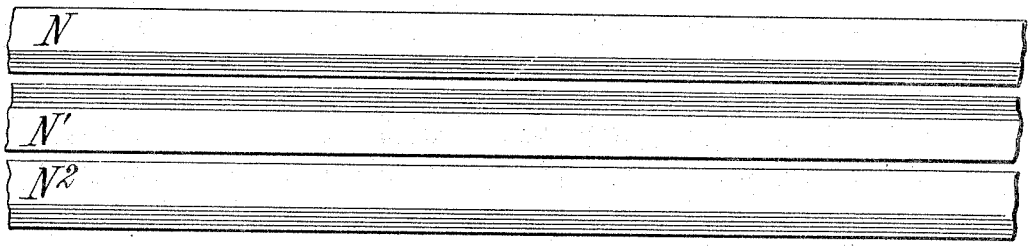

Figures 1 and 2 are respectively a side elevation and an end elevation of an ingot; Figs. 3 and 4 are similar views of a portion of a bar rolled from said ingot; Fig. 5 is a plan of the bar of Fig. 3 split along the middle to make two bars; Fig. 6 shows one of the bars formed with teeth; Fig. 7 shows the same after the hardening operation; Fig. 8 illustrates another manner of carrying out the invention.

Referring to the embodiment of the invention illustrated by the accompanying drawings, an ingot A is cast of steel, preferably of high purity such as crucible steel, with bands B B' of low-carbon steel or iron, and an intermediate band C of high carbon steel. The percentage of carbon is preferably so low as to take the parts B B' out of the class which can be hardened by heating and quenching, although there may be sufficient carbon to permit of a slight hardening or even a spring temper. The ingot is then reduced by the usual processes such as hammering or rolling, or both, to the compound strip D with the strips E and E' of low-carbon steel extending along each edge of the intermediate strip F of high-carbon steel. The different steels are cast directly on each other in the formation of the ingot, so that during all the subsequent processes they remain practically integrally united to each other.

From the strip D two separate compound strips G G' are obtained by dividing the strip D along the center of the intermediate strip F of high-carbon steel to form a high-carbon edge (H H') upon each of the strips G G' respectively.

The strips G G' are identical, and each serves to make one strip from which saw blades of any desired length are made.

Fig. 6 shows the high-carbon edge H formed with teeth J, the low-carbon back E being unaltered.

The final step in the process consists in heating the toothed strip G and quenching it as explained, which operation results in a finished saw blade K (Fig. 7) having an edge L of extreme hardness, and a back M of extreme toughness, the back M having suffered little or no change in its properties from those of the edge E of the compound strip.

The width of the hardened edge L and of the tough back M are accurately controllable by the proportioning of the quantities of high-carbon and low-carbon steel respectively in the ingot, and may be determined with great uniformity and accuracy. Likewise the degree of hardness and toughness of the parts may be determined very accurately and easily, and within a wide range, limited only by the capabilities of the material. The treatment of the entire blade simplifies very much the operation of hardening as compared with processes which attempt to treat the edge of the blade and to protect the back from treatment. The hardening process in the present case is determined as to its limits by the nature of the material, and not by any special steps to be taken during the hardening. As long as the materials are laid right in the beginning, a comparatively simple matter, the proper hardening by immersion calls for no special precautions whatever.

Making the strip of double width with one composition intermediate of two strips of the other, as shown in Fig. 3, effects a saving in the trimming or other cutting operations as previously explained, and placing the carbon strip F in the center, facilitates the rolling operation and reduces the liability of burning the high-carbon steel, since this affects most the outside edges. The economy in cutting operations may be extended by making the strip even wide enough for three or more saw blades, alternating the strips of the different metals so that each will be successively an intermediate strip between two strips of the other kind. Fig. 8 shows such a method applied to the making of three strips from which the blades are made. The successive strips N N' and N² are formed from a multiple strip having one intermediate strip of high-carbon metal and one intermediate strip of low-carbon metal, as indicated by the shading.

By the use of this process a much higher carbon steel may be provided for the edge of the saw than could safely be used where the steel is of the same carbon content throughout, and thus a saw of greater durability and reliability may be obtained.

By extensive experiments I have found certain other and very unexpected advantages peculiar to the use of this invention in in hack saws. It is quite possible for hack saw blades made according to this invention to be hardened in water and yet be perfectly tough, whereas it is the absolutely universal custom to harden these very thin blades in oil, the reason being that if hard cast steel such as is usually employed for making these tools were hardened in water it would be made brittle, and when used in a hand frame would break almost at once. Further a solid cast steel blade hardened in water would warp or twist to some slight extent, and during the process of tightening up in the hand frame would break while being stretched.

Though I have described with great particularity of detail certain specific embodiments of my invention, yet it is not to be understood therefrom that the invention is limited to the specific embodiments disclosed.

Various modifications thereof may be made by those skilled in the art, without departure from the invention.

What I claim is:—

The method of manufacturing hack saws and the like with a hard edge and a tougher back, which consists in forming a compound strip or ribbon of high carbon steel at one edge and low carbon steel at the other, the two steels being integrally united, forming teeth on the high carbon edge, and heating and quenching the entire strip, whereby the high carbon edge of the saw is hardened and the low carbon back is substantially unaltered in toughness.

In witness whereof, I have hereunto signed my name in the presence of two subscribing witnesses.

JAMES NEILL.

Witnesses:
CHARLES M. PIERCE,
DOMINGO A. USINA.